May 13, 1924.

C. H. DESAUTELS

AIR BAG TREATMENT

Filed April 17, 1922

1,494,157

INVENTOR
Charles H. Desautels
BY
ATTORNEY

Patented May 13, 1924.

1,494,157

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

AIR-BAG TREATMENT.

Application filed April 17, 1922. Serial No. 554,083.

*To all whom it may concern:*

Be it known that I, CHARLES H. DESAUTELS, a citizen of the United States of America, residing at Springfield, in the county of Hampden and State of Massachusetts, have invented certain new and useful Improvements in Air-Bag Treatment, of which the following is a specification.

My present invention relates to the treatment of articles such, for example, as the vulcanizing bags used in curing cord tire casings, with the object of greatly prolonging the life of the bags and therefore reducing the cost of tire manufacture.

The invention will be described in connection with the accompanying drawings, in which—

Figure 1:
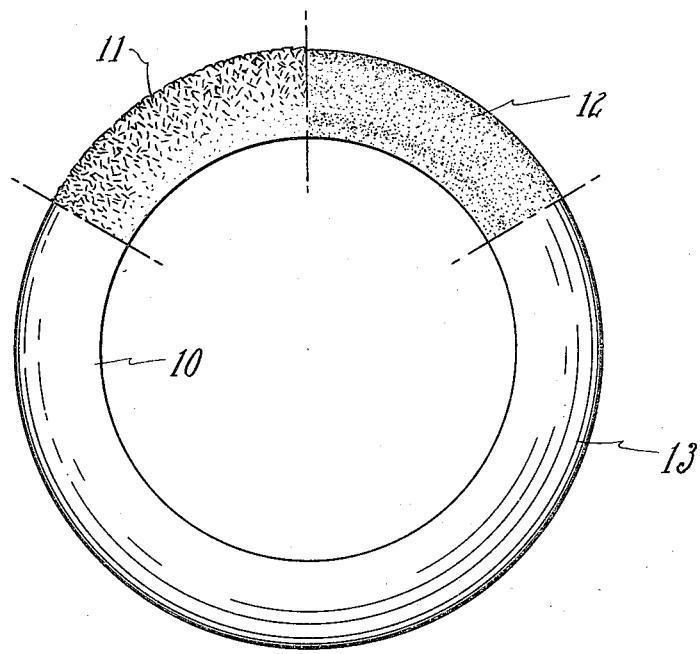
Figure 2:
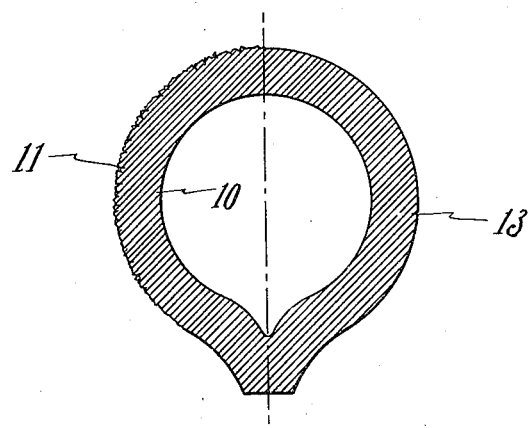

Fig. 1 is a view of a vulcanizing bag showing in adjacent segments an untreated section, a section having received partial treatment, and a section completely treated; and Fig. 2 is a transverse section of a bag of which a part is shown untreated and the remainder treated according to my invention.

In the manufacture of cord tires it is customary to vulcanize them while held distended into a rigid mold by an expansible annular bag inflated by a fluid under pressure such as air or water. Each bag is used in the vulcanization of a succession of tire casings, and as the cost of the bag is distributed among all the tires which are cured on it, it is obviously important from a manufacturing cost standpoint to increase to as large extent as possible the number of vulcanizing heats which a bag will stand. With certain types of bags, such, for example, as the so-called "gum" bags which are composed principally of rubber alone or rubber compounded with an inert filler, one of the chief causes of shortening of the life of a bag is the checking or scaling of its outer surface. After a bag has gone through a number of vulcanizing heats the rubber at its surface becomes over-cured and hard, and cracks develop which at length grow to such an extent as to cause defects in tires vulcanized on the bag. The "gum" bag is used as an illustration, but other types develop similar troubles and may be renovated by treatment according to this invention.

I have found that bags in which these surface defects occur can be renovated and their useful life much increased by burning off the outer surface of the bag. This can be accomplished by directing the flame of an acetylene or other torch directly upon the surface, or by other suitable means. This serves to fuse the rubber at the surface of the bag, both closing up the cracks and so disintegrating the outer rubber that it can easily be brushed off. Due to the low heat conductivity of the rubber the fusing effect is confined to a relatively thin layer at the outer surface, the rubber in the body of the bag being practically unaffected by the heat. The depth to which the rubber is fused may be readily regulated by the intensity of the heat and the length of its application. After the fusion of the rubber as described, and either while it is still hot or after it has been allowed to cool, the disintegrated rubber at the surface of the bag is removed, conveniently by the use of a wire brush. As this leaves a slight coating of rather sticky rubber, the adhesiveness of the surface is preferably destroyed as by dusting the bag with a substance such as powdered mica or soapstone. The bag may now be put back into use and put through successive vulcanizing heats until cracks again develop. The renovating process may be repeated until the material of the bag has become overcured throughout its thickness, or has deteriorated or been worn down to such an extent that it cannot withstand the internal pressure, and greatly increases the life of the bag. The cost of renovating the bag according to this process is insignificant in comparison to the cost of the bag, and the treatment of the bag is rapid and under conditions where the depth of treatment can be readily controlled.

In Fig. 1 of the drawing, I have shown an air bag 10 divided into three segments or zones, illustrating diagrammatically the progress of the treatment. In zone 11 are shown by short lines the cracks on the outer surface of the bag. The material at the surface is fused and disintegrated by the heating as indicated by stippling in the second zone 12. The third zone 13 represents the bag with the smooth surface imparted by brushing off the disintegrated material on the outer surface. In Fig. 2 I have shown the bag in transverse section, the left hand side representing the untreated bag in the cracked condition resulting from its use on a number of heats, and corresponding to zone 11 of Fig. 1; and the right hand side representing the treated bag in a condition corresponding to zone 13.

Having described my invention, I claim:

1. A method of renovating a rubber vulcanizing bag comprising fusing its surface, removing the fused portion, and dusting the surface with a mica-like substance.

2. A method of renovating a rubber vulcanizing bag comprising fusing its surface by the direct application of a high-temperature flame thereto, removing the fused portion, and dusting the surface with a mica-like substance.

3. A method of renovating a rubber vulcanizing bag comprising fusing its surface and removing the fused portion.

4. A method of renovating a rubber vulcanizing bag comprising fusing its surface by the direct application of a high-temperature flame thereto and removing the fused portion.

CHARLES H. DESAUTELS.